(12) United States Patent
Rodrigues et al.

(10) Patent No.: US 7,442,658 B2
(45) Date of Patent: Oct. 28, 2008

(54) IMPACT RESISTANT ROOFING SHINGLES AND PROCESS OF MAKING SAME

(75) Inventors: Tommy Rodrigues, Union, NJ (US); Frederick W. Sieling, Bound Brook, NJ (US); Awdhoot Vasant Kerkar, Rockaway, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 10/734,788

(22) Filed: Dec. 12, 2003

(65) Prior Publication Data

US 2005/0130519 A1    Jun. 16, 2005

(51) Int. Cl.
  *B32B 17/04*   (2006.01)
  *B32B 27/12*   (2006.01)
  *B32B 27/04*   (2006.01)
  *B32B 27/20*   (2006.01)

(52) U.S. Cl. .............. 442/20; 442/38; 442/40; 442/41; 442/43; 442/48; 442/74; 442/134; 442/180; 442/394; 442/395; 442/396; 442/398; 442/399

(58) Field of Classification Search ............ 442/20, 442/38, 40, 41, 43, 48, 74, 134, 180, 394, 442/395, 396, 398, 399
See application file for complete search history.

(56) References Cited

U.S. PATENT DOCUMENTS

| | | | | |
|---|---|---|---|---|
| 4,585,682 A | * | 4/1986 | Colarusso et al. | 428/57 |
| 4,636,414 A | * | 1/1987 | Tajima et al. | 428/40.3 |
| 5,571,596 A | | 11/1996 | Johnson | |
| 5,822,943 A | | 10/1998 | Frankoski et al. | |
| 6,228,785 B1 | | 5/2001 | Miller et al. | |
| 6,990,779 B2 | * | 1/2006 | Kiik et al. | 52/554 |
| 2002/0110679 A1 | * | 8/2002 | Miller et al. | 428/297.1 |
| 2002/0160151 A1 | * | 10/2002 | Pinault et al. | 428/144 |

* cited by examiner

*Primary Examiner*—Ula C Ruddock
(74) *Attorney, Agent, or Firm*—William B. Davis; Sills Cummis & Gross P.C.

(57) ABSTRACT

An impact resistant roofing shingle which includes an asphalt coated substrate whose unexposed surface is laminated to an organic film. A process of forming that shingle includes the step of applying an organic film, by spraying a latex, by applying a rubber polymer modified asphalt, by compressing a plastic film having a higher melting or decomposition temperature than the melting point of the asphalt coating or by applying an adhesive to which a plastic film is applied to the unexposed surface of the asphalt coated substrate.

16 Claims, 3 Drawing Sheets

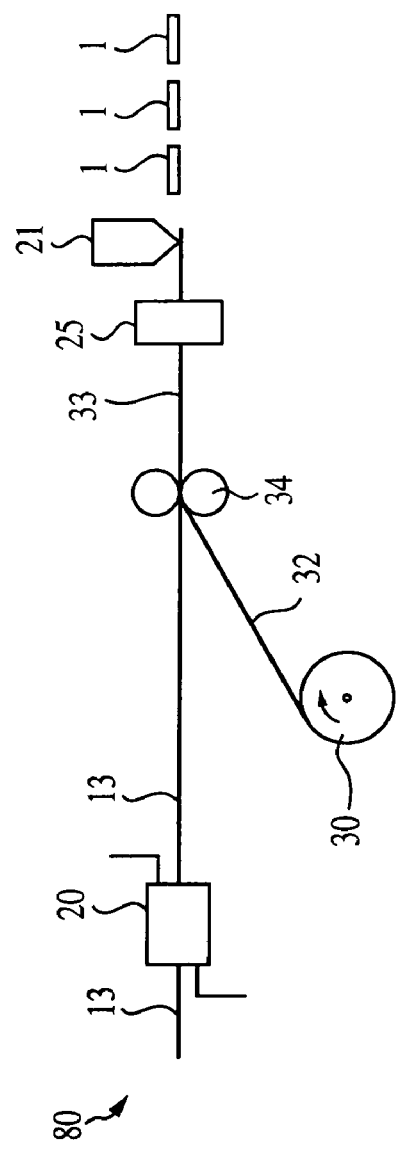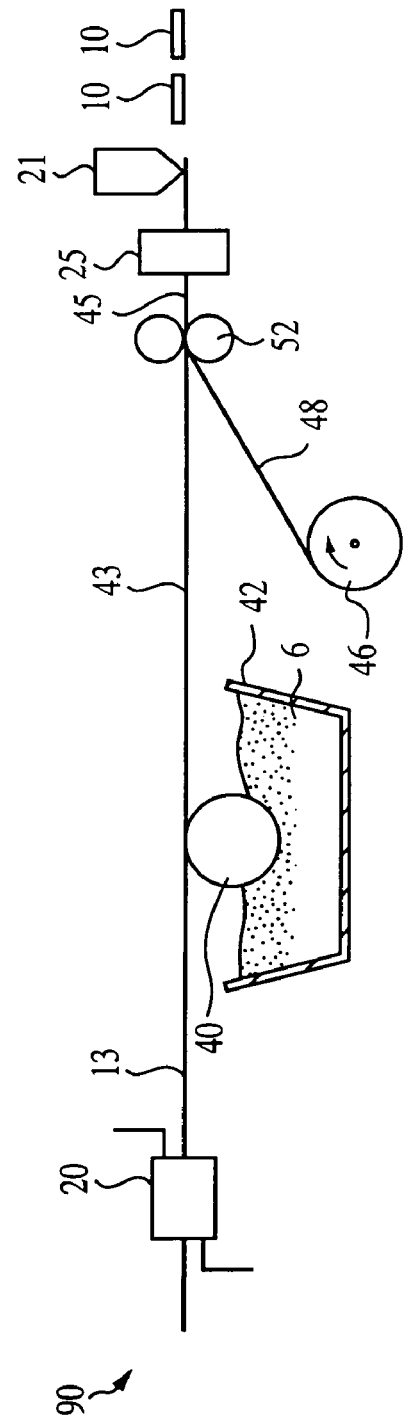

IMPACT RESISTANT ROOFING SHINGLES AND PROCESS OF MAKING SAME

BACKGROUND OF THE DISCLOSURE

1. Field of the Invention

The present invention is directed to an impact resistant roofing shingle providing far greater resistance to impact than standard roofing shingles and a process of making same. More specifically, the present invention is directed to an impact resistant roofing shingle providing the highest level of protection against impact damage to roofing shingles and a process of making those shingles.

2. Background of the Prior Art

Losses sustained to building roofs caused by climatic conditions such as hailstones has focused development of roofing shingles having increased impact resistance. This need in the art is particularly acute in those geographic areas which are subject to these climatic conditions. Specifically, such areas as the Plain and Rocky Mountain states are particularly subject to roofing damage caused by hailstorms and the like. Indeed, the insurance laws of the state of Texas provide cash rebates to homeowners insurance policies wherein the insured property's roof employs Class 4 roof covering materials.

The most recognized criteria for impact resistant roof covering materials is provided by Underwriters Laboratory Standard Test UL 2218, which is incorporated by reference. Standard Test UL 2218 categorizes roof covering materials as Class 1, 2, 3 or 4. Class 1 is the category assigned to the least resistant while Class 4 provides the highest recognized impact resistant.

Impact resistant roofing materials are known in the art. For example, U.S. Pat. No. 6,228,785 discloses an asphalt-based roofing material which includes a substrate coated with an asphalt coating in which a surface layer of granules is embedded in its top surface. The bottom surface, covered with an asphalt coating, however, is bonded to a web. The bond between the asphalt coating and the web is effectuated by fusing of the asphalt coating and the web. This is achieved by intermingling, caused by melting, of the web and the asphalt coating.

U.S. Pat. No. 5,571,596 describes an asphalt-coated roofing shingle which includes an upper layer of a directional fiber such as Kevlar fabric, a middle layer of fibrous mat material, such as a glass fiber mat, and a lower layer of a directional fiber such as E-glass fabric. Unlike the teaching of the aforementioned '785 patent, wherein the web, fused to the lower region of the asphalt coating, provides impact resistance, the impact resistance of the roofing shingle of the '596 patent is ascribed to the lower layer of directional fiber.

A third impact resistant roofing shingle is set forth in U.S. Pat. No. 5,822,943. The laminated roofing shingle of the '943 patent includes an upper layer of a scrim bonded, by means of an adhesive, to a lower layer mat. The preferred adhesive of the upper and lower layers is a rubber binder.

In addition to the aforementioned impact resisting roofing material designs, it is well known in the art to modify the asphalt coatings of roofing materials with polymer-type modifiers. Such designs, although effective in theory, have not been very effective in resisting climatic impacts caused by hailstones and the like. On the other hand, modifying the asphalt with polymer-type additives increases the asphalt coating raw material cost. In addition, installation of modified asphalt is more difficult than standard unmodified asphalt coated roofing materials.

The above remarks establish the need in the art for a new type of impact resistant roofing shingle that meets the most stringent impact resistant, e.g. Class 4 as defined in UL 2218, yet is simple in design and easy to manufacture.

BRIEF SUMMARY OF THE INVENTION

A new roofing material has now been discovered which, although simple in design and ease of manufacture, and at minimal increase in cost over standard roofing shingles, produces improved results that meet the most stringent requirements imposed by state agencies for impact resistant roofing materials in the United States.

Although the invention is independent of any theory explaining its effectiveness, it is believed that the utilization of a laminate structure provides two means of protecting a roofing shingle from impact damage. First, the laminate structure may protect the shingle from cracks caused by impact and/or the laminate structure may prevent any crack that does develop from propagating due to its cold flow characteristics. That is, if the temperature of the laminate layer is below that of the covering asphalt, the layer is theorized to provide both protection against cracking as well as self sealing protection. If the laminate layer is a material whose melting or decomposition temperature is greater that the covering asphalt the covering is theorized to provide covering protection.

In accordance with the present invention a high impact resistant roofing shingle is provided. The impact resistant roofing shingle of the present invention includes an asphalt coated substrate whose unexposed surface is laminated to an organic film.

In further accordance with the present invention, a process for making an impact resistant roofing shingle is provided. In accordance with the process of the present invention a substrate is coated with an asphalt coating and thereupon the unexposed surface of the coated substrate is laminated to an organic film.

BRIEF DESCRIPTION OF THE DRAWINGS

The present invention may be understood by reference to the accompanying drawings of which:

FIG. 5 is a schematic representation of still another apparatus for the manufacture of an impact resistant roofing shingle of the present invention; and FIG. 6 is a schematic representation of yet still another apparatus for the manufacture of an impact resistant roofing shingle of the present invention.

DETAILED DESCRIPTION

Impact resistant roofing shingles of the present invention are conventional to the extent that they include asphalt coated substrates. Substrates within the contemplation of the present invention include webs, scrims, and felts of fibrous material, such as mineral fibers, cellulosic fibers, rag fibers, synthetic fibers and mixtures thereof. Of these, mineral fibers, especially glass fibers, are particularly preferred. Indeed, a non-woven web of glass fibers is the most preferred substrate of the impact resistant roofing shingle of the present invention.

The asphalt coating employed in the roofing shingles of the present invention encompass any type of bituminous material suitable for use as a roofing material. Thus, asphalts, tars, pitches and mixtures thereof are all encompassed within the meaning of the term "asphalt coating." The asphalt can be either a manufactured asphalt, produced by refining petroleum, or a naturally occurring asphalt. The asphalt coating can include various additives and/or modifiers, such as inorganic fillers, mineral stabilizers, organic materials including polymers, recycled streams or ground tire rubber.

In a preferred embodiment of the impact resistant roofing shingle of the present invention the asphalt coating includes fillers, in the form of inorganic particulates or mineral stabilizers and granules, on the upper surface of the shingle. It is emphasized, however, that no other modification of asphalt used as the coating of the substrate, such as the inclusion of impact resistant additives, e.g. rubber or rubber-like polymers, occurs.

The impact resistant roofing shingle includes an organic film laminated to the bottom surface of the asphalt coated substrate. It is the bottom surface that is adjacent to the roof surface and is the side opposite the asphalt coated side of the substrate, also called the front or face surface, upon which, in a preferred embodiment, granules are disposed. The top and bottom surfaces of the asphalt coated roofing shingle are also referred to herein as the exposed or butt portion and unexposed or headlap portion, respectively.

Figure 1:
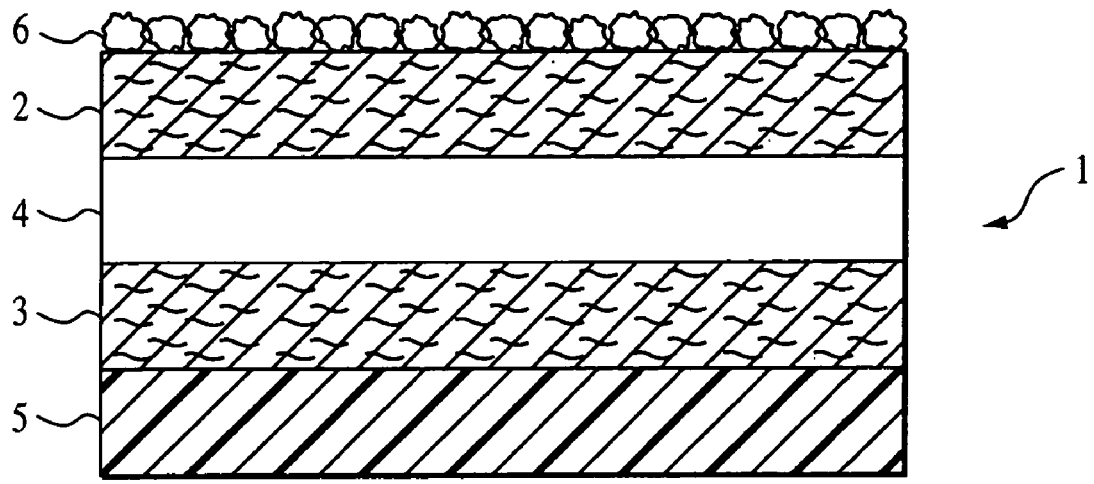
FIG. 1 is a cross-sectional view of an embodiment of a impact resistance roofing shingle in accordance with the present invention.
Figure 2:
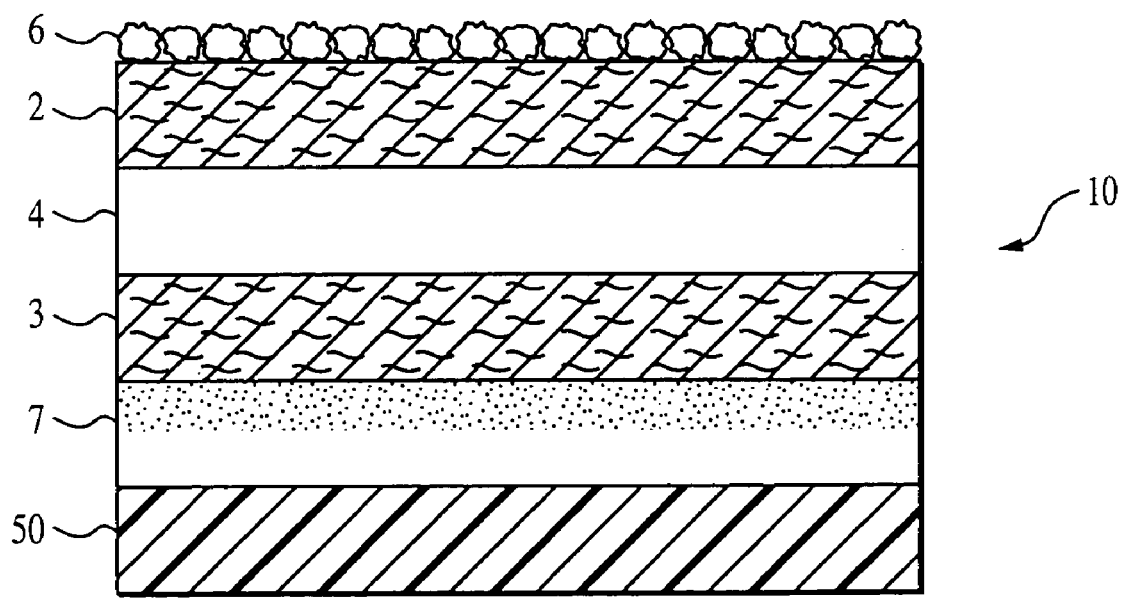
FIG. 2 is a cross-sectional view of another embodiment of an impact resistance roofing shingle in accordance with the present invention.
Figure 3:
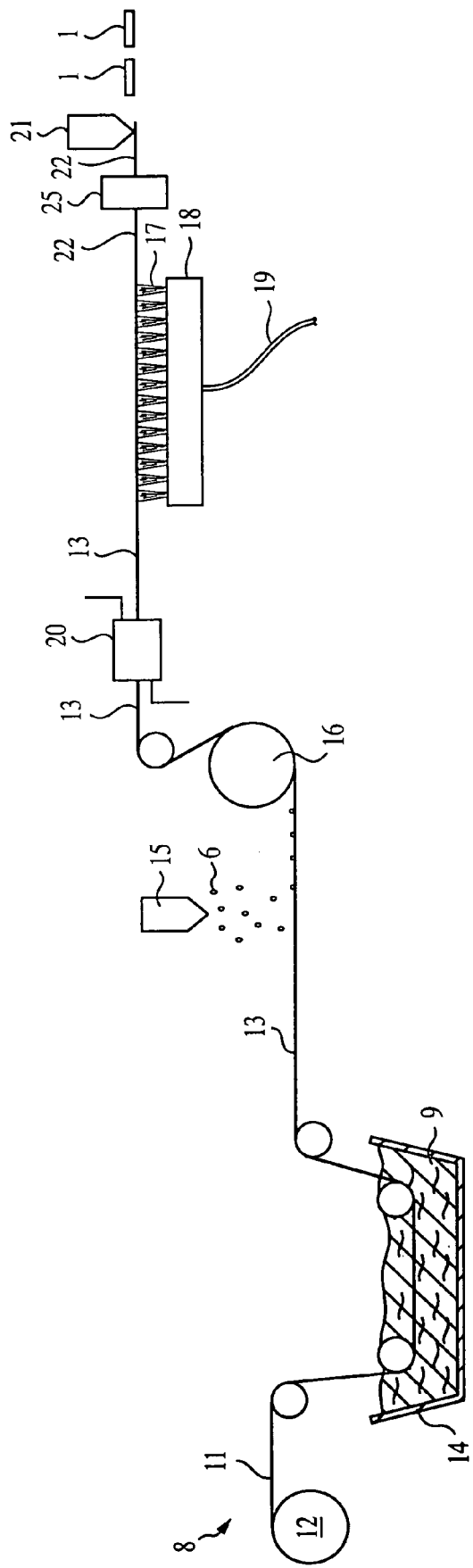
FIG. 3 is a schematic representation of an apparatus which manufactures an impact resistant roofing shingle of the present invention.
Figure 4:
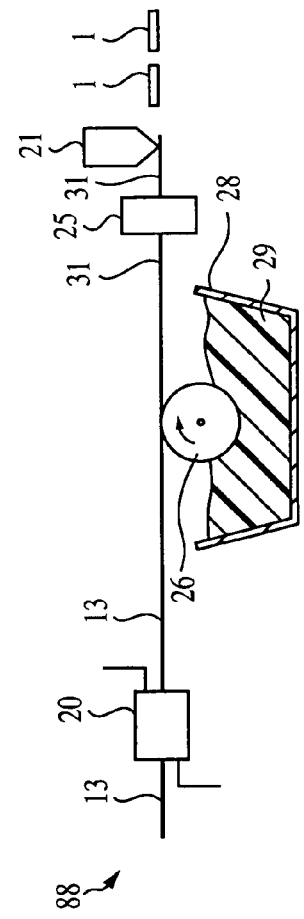
FIG. 4 is a schematic representation of another apparatus for the manufacture of an impact resistant roofing shingle of the present invention.

One preferred embodiment impact resistant roofing shingle of the present invention is depicted by roofing shingle 1. Roofing shingle 1 includes a substrate 4 which is coated on both its butt and headlap sides with an asphalt coating. As depicted in FIG. 1, the butt or exposed asphalt coating surface is represented by reference numeral 2 while the headlap or unexposed asphalt coating surface is illustrated by reference numeral 3. An organic film 5 is disposed on the bottom surface of the shingle 1 adjacent the unexposed asphalt coating 3. Roofing shingle 1 depicts the preferred embodiment wherein granules 6 are disposed in and over the top or exposed asphalt coating 2. As suggested above, the inclusion of granules is not an essential, although preferred, component of the impact resistant roofing shingle.

It is furthermore emphasized that laminate layers are shown as discrete layers. This is deliberate insofar as there is no fusing between those layers. The laminate layer is a film, or a woven or non-woven web.

The identities of the organic film 5 are provided below in the description of the process of making the impact resistant roofing shingles. That is, each of the processes described for making shingles within the contemplation of roofing shingle 1 defines organic films within the scope of that process.

In another preferred embodiment of the present invention an impact resistant roofing shingle 10 is depicted. That preferred embodiment of the roofing shingle of the present invention includes elements identical to the embodiment illustrated by roofing shingle 1, insofar as a substrate 4 is asphalt coated on top 2 and bottom 3 surfaces. However, roofing shingle 10, although including an organic film, includes an additional layer, adhesive layer 7. The adhesive of adhesive layer 7 permits bonding of the asphalt coating 3 to the organic film, defined in shingle 10 by reference numeral 50. As in the discussion of organic films 5 within the scope of roofing shingle 1, discussion of embodiments of organic film 50, within the scope of impact resistant roofing shingle 10, are set forth in the description of the process of making that shingle. In addition, adhesives within the scope of adhesive layer 6 of roofing shingle 10 are described therein.

It should be appreciated that the reference numerals of the layers of impact resistance roofing shingles 1 and 10 do not necessarily correspond to the reference numeral designations given to those materials, which constitute those layers, in the following exposition of the processes by which these shingles are manufactured. This is so because during processing webs, rather than shingles, are described.

A first embodiment of the process of preparing an impact resistant roofing shingle of the type illustrated by roofing shingle 1 is depicted by apparatus 8. Apparatus 8 includes a roll 12 from which a continuous sheet 11 is payed out. The substrate sheet 11 is passed through a coater 14 filled with asphalt 9. The substrate sheet 11 is thus immersed in the asphalt to completely coat the substrate sheet 11 with a tacky asphalt coating. Although the preferred method of asphalt coating is depicted in apparatus 8, it should be appreciated that other methods, such as by roll application, by spray application, extrusion coating and the like may be employed.

Insofar as the substrate web 11 downstream of the asphalt coating step is an asphalt coated substrate web, it is identified as web 13. Web 13, coated with tacky asphalt, is, in the preferred embodiment wherein roofing shingle 1 includes granules on its top surface, next passed under a granule dispenser 15 where granules 6 are released onto the top surface of web 13. This results in granules being disposed in and above asphalt coating 2. The granules are typically inorganic particulates such as rock coated with colored ceramic coatings, coal slag and sand. In the preferred embodiment wherein a granule dispensing step is included in the formation of roofing shingles, the asphalt coated substrate sheet 13 is turned around a slate drum 16 to press the granules into the asphalt coating.

The thus formed granule-containing substrate sheet 13 is thereupon cooled in a suitable cooling apparatus 20 to solidify the asphalt coating. Although a heat transfer unit is preferred as cooling apparatus 20, for example, a convective cooler, it is within the contemplation of the present invention to employ other cooling means, such as water sprays, water chilled rolls, accumulators or the like, to cool the asphalt in a more deliberate time frame. Other cooling means such as a chill roll, an air knife and the like may be utilized.

An organic film is thereupon applied to the cooled web of asphalt coated substrate 13. The organic film is applied to the unexposed, bottom surface of web 13 which is the surface opposite the side on which the granules, if provided, are disposed. In one preferred embodiment illustrated by apparatus 8, this is accomplished by passing web 13 over a latex spray 17 applied by a spraying means. Apparatus 8 illustrates a preferred spraying means, manifold 18. Other spraying means, such as a plurality of spray heads and the like, may be utilized. The manifold, spray heads or the like 18 is in communication with a conduit 19 which, in turn, is in communication with a source (not shown) of a latex 17. As shown in apparatus 8, the latex 17 coats the underside of the asphalt coated substrate 13 to produce a laminate layer of a plastic film.

The latex 17 may be any polymeric resin which can be dispersed in water to produce an adhesive liquid spray which adheres to the asphalt coating and solidifies to form a polymeric film. Polymers that may be employed in the latex 17, to form a laminate layer providing impact resistance, include polyurethanes, polyacrylates, such as polymethyl methacrylates, polyethyl methacrylates, polymethyl acrylates, polyethyl acrylates and the like, and polyvinyl halides, particularly polyvinyl chlorides. Other latex formable polymers may also be employed. Based on the theory of operability of the present invention, the melting or decomposition temperature of the polymer of the lax dictates whether impact protection imparted by the polymeric film provides both covering and self sealing protection or, solely, covering protection.

The thus formed laminate web is designated by reference numeral 22. Web 22 is thereupon dried to drive off the water dispersant from latex 17 and thus produce a plastic film layer within the generic scope of organic film layer 5 of impact resistant roofing shingle 1. This drying step is accomplished by passing web 22 through heating station 25. Heating station 25 may be any drying apparatus employed in drying solid materials. In a preferred embodiment the heating station 25 is a convective heating apparatus.

The resultant dry web 22 is thereupon cut and/or assembled into conventional roofing shingles 1 as is well known in the art. Cutting station 21, which may be an automated cutting knife, is employed for this purpose. The cut web is depicted in apparatus 8 as roofing shingles 1.

Another class of impact resistant roofing shingles depicted by shingle 1 is a class of impact resistant roofing shingles where the layer laminated to the asphalt coated substrate is modified asphalt. This class of impact resistant roofing shingles is produced in a process utilizing an apparatus similar to apparatus 8, employed in manufacturing the latex coated impact resistant roofing shingle of the first embodiment.

This second embodiment of roofing shingles 1 is prepared in a process utilizing apparatus 88. Apparatus 88 is identical to apparatus 8 upstream of the downstream end of drying station 20. However, in apparatus 88 the bottom side of dried asphalt coated web 13, downstream of drying station 20, is contacted by a coating roll 26. Coated roll 26 is in communication with modified asphalt 29 disposed in container 28. The bottom side of web 13 is roll coated with a layer of modified asphalt, denoted, downstream of the coating step, as web 31. The processing steps subsequent to modified asphalt coating include drying the modified asphalt coated web 31 a drying station 25 followed by cutting of web 31 into shingles 1. Drying station 25 is the same type of apparatus as is drying station 20.

It is noted that the depiction of impact resistant roofing shingle 1 in FIG. 1 illustrates the layer at the bottom of the asphalt coated substrate to be a plastic, whereas asphalt coatings 2 and 3 are depicted as asphalt. This is deliberate. The modified asphalt 29, which provides adhesive properties, insofar as it adheres to the asphalt coated substrate, includes rubbery-type polymers, such as styrene-butadiene-styrene (SBS), styrene-butadiene rubber (SBR), styrene-ethylene-butadiene-styrene (SEBS), styrene-isoprene-styrene (SIS) and the like. These rubbery polymers are plastic films having impact resistant properties. Such a product is distinguished from asphalt having less effective impact resistance.

As indicated above, the modified asphalt is applied subsequent to the application of the asphalt and includes a drying step subsequent to both the conventional and the modified asphalt application steps. As such, a laminate product of a conventional asphalt coated layer and an impact resistant modified asphalt layer is produced. That product obviously has greater impact resistance than does a single layer of conventional asphalt. Also, as indicated above, the cold flow characteristics of this laminate layer, which permits flow from the modified asphalt layer into the initial layer of the conventional asphalt coated substrate, is not provided when only modified asphalt is applied to a substrate. Conventional asphalt coated shingles are not capable of filling cracks in the asphalt coated substrate by cold flow since it does not include a second layer.

Yet a third distinction between modified asphalt coated roofing shingles of the prior art and the embodiment of the present invention discussed hereinabove resides in the lesser amount of modified asphalt contained in the impact resistant roofing shingle of the present invention. This lesser amount makes handling of such impact roofing shingles easier than is the installation of such prior art roofing shingles.

A third embodiment of the process of manufacturing roofing shingle 1 employs apparatus 80. Apparatus 80 is identical to apparatus 8 upstream of the downstream end of drying station 20. The dried asphalt coated substrate web 13 in this third embodiment is thereupon contacted, on its bottom surface, with web 32. Web 32 is payed out from roll 30 and nipped to web 13 by means of nip roll 34. The thus bonded web, denoted as web 33, is thereupon dried at drying station 25 and cut at cutting station 21 into standard shingle dimensions to produce impact resistant roofing shingles 1.

The product of this third embodiment is, like the first two embodiments, an impact resistant roofing shingle 1. This is so insofar as the organic film layer 5 of the generic shingle 1 is provided, in this embodiment, by the plastic film of web 32. That is, there is no adhesive bonding the asphalt coating 3 to the plastic film of web 32. The adhesive, bonding the asphalt coating 3 to the plastic film of web 32, is the asphalt coating 3 itself. This is so since the plastic film of web 32 has a melting point, in the embodiment wherein the plastic film is a thermoplastic, or a decomposition temperature, in the embodiment where in the plastic film is a thermosetting resin, higher than the melting temperature of the asphalt coating. The natural tackiness of the asphalt, when compressed with the plastic film web 32 at nip rolls 34, causes the asphalt coating to act as an adhesive.

Although any plastic film having a melting or decomposition temperature higher than the melting point of asphalt may be used in this embodiment, plastic films meeting this criterion, such as polyamides, e.g. nylon films, polyesters, e.g. polyethylene terephthalate, and the like are particularly preferred.

In accordance with the theory of operability of the impact resistant shingles of the present invention the plastic film provides protective reinforcement against the generation of cracks in the asphalt coated substrate.

Finally, a fourth embodiment, illustrated by impact resistant roofing shingle 10, is prepared in yet another embodiment of the process of the present invention. This process is depicted by apparatus 90. Apparatus 90 is identical to apparatus 8 upstream of the downstream side of drying station 20. Downstream of this point, an adhesive layer is applied to the asphalt coated substrate web 13 by contacting the bottom, unexposed surface of asphalt coated web 13 with an adhesive.

A preferred method of application is illustrated by apparatus 90. In apparatus 90 an adhesive 6 is applied to the underside of web 13 by application roll 40 which is in communication with adhesive 6 disposed in adhesive holding vessel 42. The thus formed asphalt coated substrate, whose bottom surface is adhesive coated, formed downstream of the adhesive roll 40, is designated by reference numeral 43.

A plastic film roll 46, which pays out a plastic film 48, is drawn out by nip roll 50 which compresses the adhesive laden bottom surface of web 43 with plastic film 48 to produce a laminate web which includes an asphalt coated substrate layer, an adhesive layer and a plastic layer, designated as web 45. Similarly, the plastic film 48 can be precoated with adhesive prior to adhesion to web 13, thus eliminating the need of application roll 40 and its associated apparatus. Web 45 is dried and cut into appropriate roofing shingle size by drying and cutting stations 25 and 21, respectively, to produce impact resistant roofing shingles 10.

The adhesive 7 employed in apparatus 90, to produce the roofing shingle of this fourth embodiment, may be any appropriate adhesive suitable for bonding a plastic film to an asphaltic coating. Indeed, the adhesive may be an asphaltic adhesive of the type employed in forming the impact resistant asphaltic coating discussed above. That is, the adhesive may be an asphaltic adhesive which, as stated above, is usually a rubber polymer modified asphalt. Many other adhesives may also be employed. Thus, acrylic adhesives, polyurethane adhesives, silicone adhesives, rubber polymer based adhesives, e.g. SBS, SBR, SEBS and SIS, may alternately be utilized. It is preferred that the adhesive have cold flow characteristics so that sealing of cracks that may develop can be self-sealed.

The plastic film 48, employed in producing web 45, which, when cut into appropriate size, provides impact resistant roofing shingles 10, may be any commercially available plastic. Thus, the melting point or decomposition temperature of the thermoplastic or thermosetting film can be below, equal to or above the melting point of the asphalt coating. The expedient of including an adhesive 7 assures that bonding of the plastic film to the asphalt coated substrate is independent of the melting point of the plastic film. This freedom to employ any plastic film extends the class of films useful in the manufacture of the impact resistant roofing shingle to encompass films whose melting or decomposition temperature is less than the melting point of asphalt. Thus, polyvinyl chloride, polyurethane and other low melting or low decomposition temperature resins may be employed as, of course, may be plastic whose melting or decomposition temperatures are greater than the melting point of the asphalt coating.

The above embodiments are given to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

What is claimed is:

1. An impact resistant roofing shingle comprising:
    a non-woven glass fiber substrate having an exposed side and an unexposed side;
    an asphalt coating applied to the exposed side and the unexposed side, the asphalt coating having a first melting temperature;
    a plurality of granules directly layered on the asphalt coating of the exposed side;
    an organic film adhered to the asphalt coating of the unexposed side, the organic film having high-impact resistance qualities and a second melting temperature; and
    a rubber polymer modified asphaltic adhesive adhered to the asphalt coating of the unexposed side and adhered to the organic film, the modified asphaltic adhesive having a third melting temperature,
    wherein the third melting temperature is higher than the first melting temperature thereby allowing the modified asphaltic adhesive to prevent and seal cracks that may develop in the roofing shingle, and the second melting temperature being independent from the first and third melting temperatures.

2. A shingle in accordance with claim 1 wherein the second melting temperature is higher than the first melting temperature.

3. A shingle in accordance with claim 1 wherein the second melting temperature is equal to the first melting temperature.

4. A shingle in accordance with claim 1 wherein the second melting temperature is lower than the first melting temperature.

5. A shingle in accordance with claim 1 wherein said organic film is any class of plastic films that are useful in the manufacture of impact resistant roofing shingles regardless of melting temperature.

6. A shingle in accordance with claim 1 wherein said organic film is a plastic film.

7. A shingle in accordance with claim 1 wherein said organic film is a latex plastic.

8. A shingle in accordance with claim 7 wherein said latex plastic is selected from the group consisting of a polyurethane, a polyacrylate and polyvinyl halide.

9. A shingle in accordance with claim 1 wherein said rubber polymer modified asphaltic adhesive contains one of styrene-butadiene-styrene (SBS), styrene-butadiene rubber (SBR), styrene-ethylene-butadiene-styrene (SEBS), styrene-isoprene-styrene (SIS) and mixtures thereof.

10. A shingle in accordance with claim 1, wherein said organic film is selected from the group consisting of polyamide films and polyester films.

11. A shingle in accordance with claim 1, wherein said organic film is polyethylene terephthalate film.

12. A shingle in accordance with claim 1 wherein said modified asphalt adhesive may contain a rubber polymer, an acrylic, a polyurethane or a silicone.

13. A shingle in accordance with claim 1 wherein said substrate is a web, a scrim or a felt of a fibrous material.

14. The shingle in accordance with claim 13, wherein said fibrous material is selected from the group consisting of mineral fibers, cellulosic fibers, rag fibers, synthetic fibers and mixtures thereof.

15. A shingle in accordance with claim 1 wherein said organic film is a polyolefin film.

16. A shingle in accordance with claim 1 wherein said asphalt coating is a cooled asphalt.

* * * * *